Feb. 2, 1943  C. D. CANTRELL, JR  2,309,625
SAMPLING APPARATUS
Filed Oct. 3, 1940
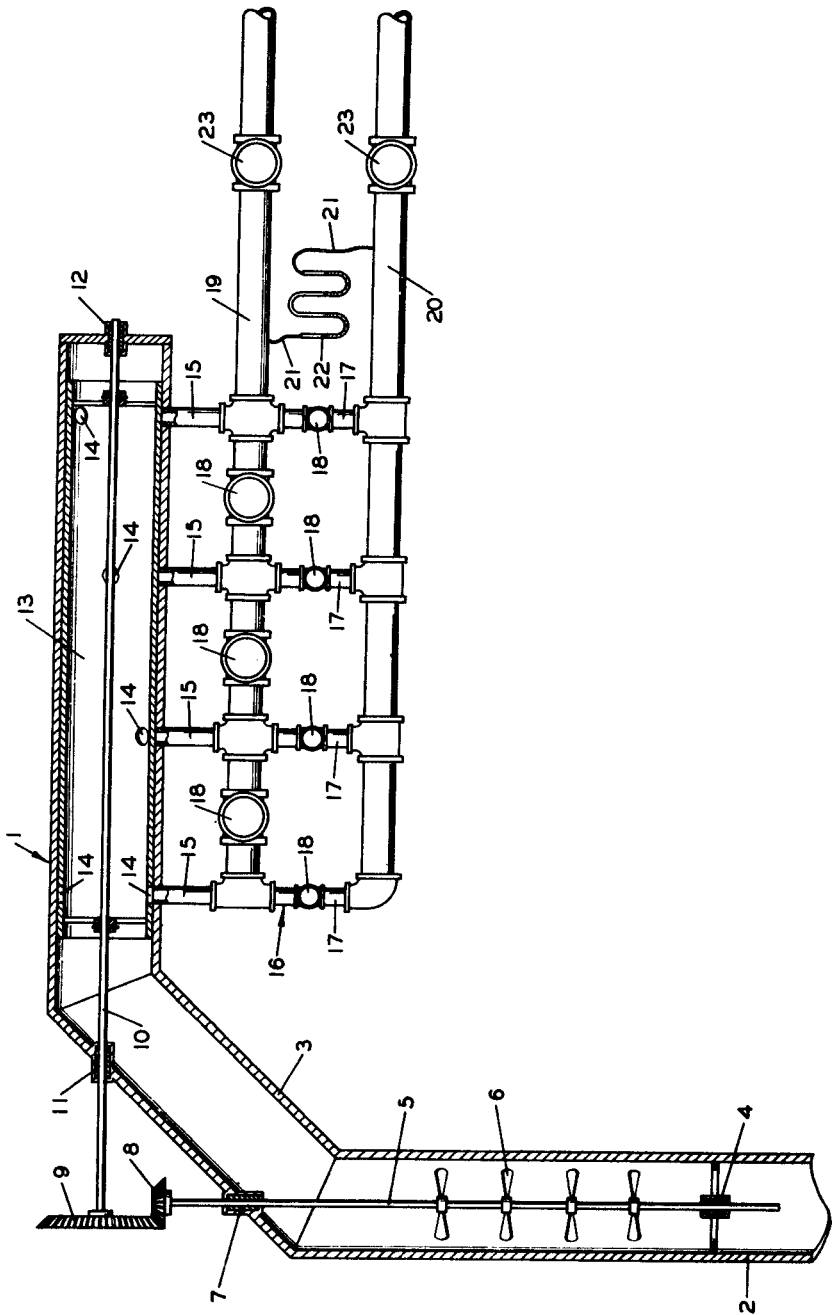
INVENTOR
CYRUS D. CANTRELL JR.
BY
Hudson, Young, Shawley & Yinger
ATTORNEY Patented Feb. 2, 1943

2,309,625

UNITED STATES PATENT OFFICE 2,309,625

SAMPLING APPARATUS

Cyrus D. Cantrell, Jr., Bartlesville, Okla., assignor to Phillips Petroleum Company, a corporation of Delaware Application October 3, 1940, Serial No. 359,602

2 Claims. (Cl. 137—166)

This invention relates to sampling, and more particularly to obtaining represenative samples of fluids being conveyed through conduits.

It is often very desirable to know the amount of fluid being produced by a hydrocarbon oil well and the quantity of each component part of that fluid. This knowledge is useful in determining efficient production rates for a hydrocarbon oil well and is necessary for determining the amount of hydrocarbon oil and gas reserves within a reservoir.

Usually, a hydrocarbon oil well is produced into a variety of separators, receivers, stock tanks and the like, where the component parts of the fluid are separated and metered or measured for quantity. This method of sampling has undesirable operating features; for instance, if more than one well is being produced simultaneously into a central storage battery system, it becomes necessary to shut-in all wells other than that being tested in order to obtain a representative test of the production rate of the fluid and the component parts thereof. Where the testing of individual wells is of primary importance, duplicate separating and storage facilities must be erected in order to prevent any shortage of production that might be caused by having other producing wells shut-in at the time of testing an individual well. With the present methods of testing wells, it is often necessary to limit the length of test to shorter periods than that desired, as it is usually desirable to keep all wells in operation.

The practice of my invention simplifies the procedure of testing individual wells by installing a sampling device in the lease fluid conduit system between the well and the tank battery system. By cutting-out a representative sample of a predetermined fraction of the total fluid passing through the conduit, accurately testing that fraction and returning the same to the original volume, a well may be tested for any desirable length of time without interrupting the operations of the other wells producing into a central tank battery system.

The present invention also eliminates the employment of duplicate systems of separators, receiving tanks, and/or storage tanks which are essential with the present methods of well testing where individual well tests are a necessary operation and where all wells producing into a central storage battery system must be produced continuously and without interruption.

The primary object of this invention is to provide an improved fluid sampling apparatus.

Another object is to provide an improved apparatus for taking a representative sample of fluid from a conduit.

A still further object is the provision of an improved apparatus for taking a representative sample of fluid produced from a hydrocarbon oil well, said sample being taken at some desirable point in a lease fluid conduit system for the purpose of testing component parts of the fluid.

These and additional objects and advantages will be readily apparent to persons skilled in the art by reference to the following description and annexed drawing which pertains to a preferred embodiment of my invention.

For the purpose of illustration, the application of this invention is shown with respect to obtaining samples of fluid as produced from a hydrocarbon oil well and as conveyed through the customary lease conduit system. It is to be understood that this is only one of the many uses to which this device may be satisfactorily and economically applied in actual practice.

The drawing represents a rotating cylinder type of device for obtaining representative fluid samples, partly in cross section.

Referring to the drawing, a stationary cylindrical chamber 1 communicates with a fluid conduit 2 through a conduit 3. Inlet conduit 2 has a bearing 4 which aids in suspending a shaft 5 to which suitable impeller blades 6 are attached and which rotates through a bearing 7. A bevel pinion 8 is secured to shaft 5 and is in engagement with a bevel gear 9 which is secured to a shaft 10 that rotates through bearings 11 and 12. Bevel pinion 8 and bevel gear 9 are desirable for reducing the rotational speed of shaft 10. In this embodiment, conduit 2 is at right angles to chamber 1. It is obvious, however, that chamber 1 may be made coaxial with conduit 2 by the elimination of conduit 3, bearing 7, bevel pinion 8, bevel gear 9, and bearing 11, by making shaft 10 an extension of shaft 5 and by connecting conduit 2 directly to chamber 1. A rotating cylinder 13 is also secured to shaft 10 and contains a plurality of substantially equal ports 14 which are disposed longitudinally and around the periphery of cylinder 13. Stationary chamber 1 has a plurality of outlet conduits 15 communicating with a header system 16 which contains a plurality of suitable conduits 17 and valves 18 properly arranged to communicate with a tank battery conduit 19 and a sample conduit 20 so that a predetermined fraction of fluid can be made to flow through the conduits. Both conduits 19 and 20 communicate with a closed manometer 22 through manometer conduits 21. Suitable valves 23 are placed in conduits 19 and 20 on the downstream side of manometer conduits 21.

In operation, rotating cylinder 13 within stationary chamber 1 receives fluid from fluid conduit 2 by way of conduit 3. The incoming fluid by passing over blades 6 causes shaft 5 to rotate. This rotation is transferred to shaft 10 by meshing bevel pinion 8 with bevel gear 9, thus turning rotating cylinder 13. Fluid leaves cylinder 13 through ports 14, flowing through conduits 15 to header 16. Individual ports 14 pass their respective conduits 15 as rotating cylinder 13 revolves about its axis, dividing the fluid therein into as many parts as there are conduits 15. By opening and closing the desired valves 18, the proper fractions of the fluid are sent respectively to the tank battery conduit 19 and to the sample conduit 20. In order to obtain a representative sample, it is necessary that the pressure in conduits 19 and 20 be the same upon leaving header 16. This is accomplished by placing a valve 23 in each of these conduits which may be manually controlled to insure the proper proportion of fluid flowing from each conduit. Manometer 22 indicates any differential in pressure in the two conduits and is recommended for the proper manual adjustment of valves 23. A still smaller fraction of the total fluid can be obtained by connecting a number of similar devices in series. For automatic operation, valves 23 can be of such type that any differential in pressure on the upstream side of the valves will automatically adjust the valves for equal pressure. In such cases, manometer 22 may be eliminated.

It is to be understood that the above form of my invention herewith shown and described is to be taken as a preferred example of the same and that various changes in size, shape, and arrangement or application may be resorted to without departing from the spirit of the invention, and further, that the theories of operation, as set out in this invention, although believed to be sound and workable, are not to be construed as the sole basis for operating this device. This device operates successfully whether or not upon the principles described herein, and is to be limited only by the appended claims.

I claim:

1. In apparatus for obtaining representative samples of fluid flowing through a conduit, the combination comprising a chamber communicating with the conduit, a fluid sampler line, a fluid flow line, a plurality of outlets for the chamber, means for interconnecting the outlets with the flow line and the sampler line so that the number of outlets in communication with the sampler line and the flow line may be varied, a hollow member rotatable within the chamber, a plurality of passages in the hollow member establishing communication between the interior and exterior thereof, said passages registering with corresponding aforementioned outlets to transmit predetermined proportions of fluid admitted into the chamber through each line.

2. In apparatus for obtaining representative samples of fluid flowing through a conduit, the combination comprising a chamber communicating with the conduit, a fluid sampler line, a fluid flow line, a plurality of outlets for the chamber, means for interconnecting the outlets with the flow line and the sampler line so that the number of outlets in communication with the sampler line and the flow line may be varied, a hollow member within the chamber, a plurality of passages in the hollow member establishing communication between the interior and exterior thereof, and means actuated by the flow of fluid in the fluid conduit for rotating the hollow member to cause the passages to register with corresponding aforementioned outlets.

CYRUS D. CANTRELL, Jr.